2,793,129
Patented May 21, 1957

2,793,129

HYDRAULIC CEMENTITIOUS MIXTURES

Alexander Klein, Contra Costa County, Calif.

No Drawing. Application September 4, 1953,
Serial No. 378,679

7 Claims. (Cl. 106—90)

This invention relates to concrete, mortar, grout, and the like, herein generically called "hydraulic cementitious mixtures," containing an admixture for modifying the properties thereof, and to a method of preparing such mixtures.

Hydraulic cementitious mixtures may, for the present purpose, be defined as mixtures containing essentially a hydraulic cement as the cementing ingredient, aggregate and water, having the property of setting to form a hardened mass, hydraulic cement being cement that can harden under water. Such mixtures may contain any hydraulic cement, such as Portland cement or blends of Portland cement and such materials in finely divided form as natural cement, water-quenched blast furnace slag, and pozzolanic materials, e. g., volcanic ash, fly ash, kieselguhr or diatomaceous earth, etc.; they may contain mineral or non-mineral aggregates or mixtures thereof. Of particular interest among the various mixtures with which the invention is concerned are concretes and grouts; in the former, cement, water and aggregate, including coarse materials, are mixed together prior to being molded or otherwise emplaced; grouts, on the other hand, are mixtures consisting mainly of cement, water, and sand of small size, which can usually be pumped through pipe lines and normally have such fluidity that they can be readily forced into small spaces, such as voids and cracks or a porous or honeycombed concrete mass or into the interstices of preplaced aggregate.

The term "admixture" denotes a substance, other than aggregate, water or the cement used as the binding material, that is used as an ingredient for the cementitious mixture for modifying the properties thereof in such a way as to make it more suitable for the work in hand. They are well recognized in the art and have been classified into several groups according to the type of materials constituting the admixture, or to the characteristic effects of their use. (See Admixtures for Concrete, A Report by ACI Committee, 212 J. Amer. Concrete Inst., vol. 16, No. 2, November 1944.)

Of major importance in the art are the problems of insuring good plasticity, high early strength and high ultimate strength of cementitious mixtures. Increased plasticity improves workability and fluidity, and inexpensive admixtures have long been sought for increasing plasticity without either incurring the expense of using an unduly high proportion of cement or of making a sacrifice to strength by using an excessive amount of water. For methods used in determining the consistency and workability of cementitious mixtures, see U. S. Patent No. 2,588,248.

A drawback of many commercially available admixtures of the type considered in the preceding paragraph is that they are not universally applicable to different types of hydraulic cement. Thus, it was found that certain Portland cements are poorly responsive to admixtures that are highly effective with other Portland cements. Another drawback of many such admixtures is that their effectiveness in improving strength becomes smaller as the hardened mass ages; thus, while the ratio of the compressive strength of concrete containing such admixtures to the compressive strength of like concrete but free from the admixture is well above unity at 7 days, this ratio often decreases markedly with increasing age.

It is an object of this invention to increase the strength of hydraulic cementitious mixtures by including therein an admixture which is effective with a wide variety of hydraulic cements of different origins. A related object is to improve the strength characteristics of such mixtures by incorporating therein an admixture that is highly effective to increase not only the early strength but particularly the later strength of the hardened mass.

Still a further object is to provide an admixture of the type described that is economical. Further objects will become apparent from the following description.

Now according to this invention it was found that the strength characteristics of hydraulic cementitious mixtures can be improved by incorporating therein a small amount of the end liquor resulting from the separation of glutamic acid from concentrated Steffen filtrate, said material being herein called "end liquor." The end liquor may be incorporated to advantage in amounts, reckoned on a dry basis, between about 0.02 and 0.8 percent by weight of the amount of hydraulic cement in the cementitious mixture. It may be introduced either in its natural, acidic state at a pH of about 3.2 (either with the naturally occurring water, or after dilution with water or concentration by removal of water) or wholly or partially neutralized with a base, such as a hydroxide of sodium, potassium or calcium, etc., or an organic base, to increase the pH, preferably to about 4.5 to 8.0. This increase in pH facilitates packaging, shipping and handling of the admixture; it also renders the admixture effective when used in conjunction with other admixtures which may be incompatible with or ineffective in a highly acidic medium and which may be included in the cementitious mixture to impart a desirable characteristic thereto, e. g., the entrainment of air. A particularly effective and economical form of basic material for neutralizing the end liquor is concentrated Steffen filtrate itself, herein for convenience denoted as CSF, which may be added to the said end liquor, herein denoted at EL, in the proportion of about one fourth to two parts of CSF for each part of EL, both amounts reckoned on dry bases. It is advantageous to employ that amount of CSF which will produce a combined product with a pH within the range indicated above; a slightly acid product, below about 6.5, e. g., about 5, is preferred and was found to lead to improved strength characteristics. Amines, such as triethanol amine, may also be used as a neutralizing base.

The admixture containing EL as described above may be added to the hydraulic cementitious mixture either alone as the only admixture, or in conjunction with other admixtures, which may be incorporated separately or together with the EL admixture after combination therewith. As an example, it is possible to use as an additional admixture an air-entraining agent, such as a foaming resin, a sulphonated hydrocarbon, alkyl aryl sulphonates, or the like, or an accelerator, such as calcium chloride, such admixtures being known per se and hence not further described herein. When such an additional admixture is not stable or effective at a low pH it is advisable to neutralize the EL to the extent necessary with either organic or inorganic bases, in the manner described above, both in the case in which the additional admixture is incorporated separately and when it is combined with the EL.

The admixture according to the invention can be incorporated in the hydraulic cementitious mixture in any suitable manner, e. g., separately during the mixing or together with one or more of the main ingredients of the mixture, care being taken to insure proper mixing. The admixture may be added to the dry cement or to a small part thereof with which it may be intimately mixed to obtain a better distribution throughout the final mixture. It may also be added to sand, which when subsequently mixed with cement and water, produces grout or mortar or, with the addition of coarser aggregate, produces concrete. In most cases, however, it is simplest to add the admixture to the mixing water, preferably forming a solution in a portion of the water and then combining the solution with the remainder of the water.

The admixture according to this invention is not primarily a plasticizer but does have some plasticizing properties, as will be apparent from the experimental data presented hereinafter.

By way of example, the following typical method of producing CSF and EL is presented; it should be explained, however, that the details of the method may vary in different industrial plants. In the beet sugar industry, molasses is a sugar syrup from which sugar has been recovered until it is so impure that further crystallization of sugar from it is impractical. In the Steffen process such molasses are treated with the oxide or hydroxide of a heavier element of group II–A of the periodic system of the elements, particularly calcium or barium, to form insoluble addition products of sucrose and some other sugars; the insoluble addition products are separated by filtration, and the practically sugar-free filtrate is known as Steffen filtrate. It contains glutamic acid among other substances. This filtrate is carbonated as soon as produced to precipitate calcium and/or other heavier elements noted above as the corresponding carbonate, which is removed by thickening and filtration. The filtrate is then concentrated to about 65% solids in a series of evaporators, to produce concentrated Steffen filtrate (CSF). It has a pH of about 10.

To recover glutamic acid from the CSF, suspended solids are removed by filtration and the resulting filtrate is run into hydrolyzers wherein it is mixed with a 50% solution of caustic to convert pyrrolidone carboxylic acid to L-glutamic acid. The liquor is then cooled and partially acidified with hydrochloric acid and concentrated in a single effect flash-type evaporator, resulting in crystallization of mixed sodium and potassium chlorides containing about 30% $K_2O$. These are filtered off and the filtrate is further acidified to bring the pH to 3.2, which is the isoelectric point of glutamic acid. The acidified solution is then cooled to crystallize the glutamic acid, which is thereupon separated by centrifuging. The filtrate is the end liquor (EL) used in the instant invention; it has a pH of about 3.2.

The EL normally has a solids content of about 51%; however, since this is subject to some variation, the quantities of EL specified herein are reckoned on a dry basis. Similarly, the CSF may have a solids content differing from 65% and the amounts thereof are reckoned on the dry basis.

The EL admixture according to this invention should be distinguished from prior admixtures that contain or consist largely of sugar or sugar-containing substances such as molasses. Such prior admixtures were added only as plasticizers; however, they generally have the inherent property of retarding the setting of hydraulic cement and therefore reduce the early strength. To counteract such retardation it was generally advisable to include an accelerator, such as calcium chloride, in such prior admixtures. While such accelerators may also be used with the admixtures according to this invention, they are not usually included because the novel admixtures improve early strength as well as later strength.

The efficacy fo the admixtures according to the invention is demonstrated by the following experimental data:

EXAMPLE I

A plurality of fresh concrete batches were prepared from Portland cements of different origins, as indicated by Roman numerals below, and graded mineral aggregate from 0 to ¾ in. size in the ratio of 1:6.7, the aggregate having a fineness modulus of 5.1. Cements I, II and III were of ASTM type I, and cement IV of ASTM type II. For each Portland cement several different batches were prepared as follows: (a) a control batch without any admixture: (b) a batch with an admixture consisting essentially of the calcium salt of waste sulfite liquor (containing lignin sulfonic acid) which is a good commercial admixture for promoting early strength and is typical of known admixtures of this type; (c) a batch with an admixture consisting of EL, added at a pH of 3.2; (d) a batch with an admixture consisting of the product produced by mixing EL with that amount of CSF required to produce a pH of 5. The quantities of the admixtures in batches (b) and (c) were 0.266% and 0.191% by weight, respectively, on a dry basis, of the amount of cement in the batch, and in batch (d) the admixture contained EL in the amount of 0.096% and CSF in the amount of 0.100% by weight, both on dry bases, of the cement. In each batch the ingredients were mixed with water in amounts required to produce fresh concretes of the same workability as determined by the remolding effort, viz., a remolding effort of 21 jigs. These concretes were molded in 3- by 6-in. cylinders and cured at standard conditions in a foggy atmosphere. Strengths were determined after 3, 7 and 28 days; each tabulated value, shown in Table I, is the average of several samples:

*Table I*

[Tests on 3 x 6-in. concrete cylinders prepared from 1:6.7 mixtures of various Portland cements and graded mineral aggregate, fineness modulus 5.1, max. size 3/4-in., water content adjusted to 21 jigs remolding effort.]

| Cement | Admixture | Water to Cement Ratio | Compressive Strengths | | | | | |
|---|---|---|---|---|---|---|---|---|
| | | | 3 days | | 7 days | | 28 days | |
| | | | p. s. i. | percent | p. s. i. | percent | p. s. i. | percent |
| I | None | 0.53 | 1,480 | 100 | 2,400 | 100 | 3,850 | 100 |
| I | b | 0.50 | 1,600 | 108 | 2,670 | 111 | 4,120 | 107 |
| I | c | 0.52 | 1,730 | 117 | 2,930 | 122 | 4,600 | 120 |
| I | d | 0.50 | 1,790 | 121 | 3,010 | 125 | 4,550 | 118 |
| II | None | 0.54 | 1,910 | 100 | 2,990 | 100 | 4,580 | 100 |
| II | b | 0.50 | 2,320 | 121 | 3,440 | 115 | 5,010 | 109 |
| II | c | 0.54 | 2,100 | 110 | 3,300 | 110 | 4,900 | 107 |
| II | d | 0.53 | 2,200 | 115 | 3,660 | 122 | 5,250 | 115 |
| III | None | 0.55 | 1,520 | 100 | 2,430 | 100 | 4,040 | 100 |
| III | b | 0.49 | 1,780 | 117 | 2,820 | 116 | 4,570 | 113 |
| III | c | 0.53 | 1,950 | 128 | 3,030 | 124 | 4,580 | 113 |
| III | d | 0.52 | 2,110 | 139 | 3,130 | 129 | 4,720 | 117 |
| IV | None | 0.54 | 1,590 | 100 | 2,540 | 100 | 4,390 | 100 |
| IV | b | 0.49 | 2,260 | 142 | 3,530 | 139 | 5,320 | 121 |
| IV | c | 0.50 | 2,360 | 148 | 3,510 | 138 | 5,240 | 120 |
| IV | d | 0.51 | 2,180 | 137 | 3,500 | 138 | 5,190 | 118 |

It will be noted that compressive strengths are reported both in pounds per square inch and as percentages of strengths of the control batches for the respective cements. The data show that the admixtures c and d, which are according to the invention, were effective with all types of cements, and that the admixture b, while effective with cements III and IV and moderately effective with cement II, had only a small effect on cement I. The data further show that the admixtures c and d produced increased strengths at 28 days as well as at earlier times, while the admixture b was relatively less effective at 28 days than at earlier times, indicating a higher ultimate strength with the admixtures according to the invention.

EXAMPLE II

To test the effectiveness of the admixtures according to the invention when used together with air-entraining agents, a plurality of batches of concrete were prepared as described in Example I, but using only the cements I and IV. In some batches 6% of the Portland cement was replaced by pozzolan; this is indicated by the letter P in Table II and the percentage of the admixture is in each such batch based on the sum of pozzolan and Portland cement. Air-entraining agents were included in all batches other than the control batches in amounts to produce similar effects, as follows: F was a commercial air-entraining agent consisting essentially of neutralized resins, added in an amount of 0.005 weight percent; and G and H were commercial air-entraining agents of different brands, both consisting essentially of sulphonated hydrocarbons and added in amounts of 0.008 and 0.005 weight percent, respectively. The amounts of these agents are reckoned on dry bases, based on the total cement content of the batch. The results were as follows:

*Table II*

[Tests on 3 x 6-in. concrete cylinders prepared as for Table I showing effect with air entraining agents.]

| Cement | Air Entr. Agent | Admixture | Water to Cement Ratio | Compressive Strengths | | | | | |
|---|---|---|---|---|---|---|---|---|---|
| | | | | 3 days | | 7 days | | 28 days | |
| | | | | p.s.i. | Percent | p.s.i. | Percent | p.s.i. | Percent |
| I | | None | 0.53 | 1,480 | 100 | 2,400 | 100 | 3,850 | 100 |
| I | F | b | 0.49 | 1,660 | 112 | 2,570 | 107 | 3,680 | 95 |
| I+P | G | c | 0.50 | 1,720 | 116 | 2,810 | 117 | 4,370 | 114 |
| I | G | d | 0.50 | 1,890 | 128 | 2,970 | 124 | 4,290 | 112 |
| IV | | None | 0.54 | 1,590 | 100 | 2,540 | 100 | 4,390 | 100 |
| IV | F | b | 0.46 | 2,390 | 150 | 3,580 | 141 | 5,090 | 116 |
| IV+P | H | c | 0.48 | 2,350 | 148 | 3,510 | 138 | 4,830 | 110 |
| IV | G | d | 0.49 | 2,410 | 152 | 3,550 | 140 | 4,810 | 109 |
| IV+P | G | d | 0.49 | 2,430 | 153 | 3,620 | 143 | 5,230 | 119 |

The foregoing data demonstrate the utility of the admixtures c and d, in accordance with this invention, not only when used together with air entraining agents, but also when used with cement containing pozzolan.

It is evident that the cementitious mixtures to which the invention can be applied are not limited to those employed in concrete, brick or stone structures, but may include any such mixture containing a hydraulic cement, e. g., stucco.

I claim as my invention:

1. A cementitious mixture consisting essentially of hydraulic cement as the cementing ingredient and a small amount of the end liquor resulting from the separation of glutamic acid from concentrated Steffen filtrate, said amount, reckoned on a dry basis, being between about 0.02 and 0.8 percent by weight of the cement content of said mixture.

2. A cementitious mixture consisting essentially of hydraulic cement as the cementing ingredient, a small amount of the end liquor resulting from the separation of glutamic acid from concentrated Steffen filtrate, said amount, reckoned on a dry basis, being between about 0.02 and 0.8 percent by weight of the cement content of said mixture, and an amount between about one fourth and twice the amount of said end liquor, both reckoned on dry bases, of concentrated Steffen filtrate.

3. A cementitious mixture according to claim 2 wherein the amount of concentrated Steffen filtrate is such as to form, when combined with the amount of end liquor present in said mixture, a combined product having a pH between about 4.5 and 6.5.

4. A cementitious mixture consisting essentially of hydraulic cement as the cementing ingredient, an air-entraining agent, and a small amount of the end liquor resulting from the separation of glutamic acid from concentrated Steffen filtrate, said amount, reckoned on a dry basis, being between about 0.02 and 0.8 percent by weight of the cement content of said mixture.

5. A cementitious mixture consisting essentially of hydraulic cement as the cementing ingredient, pozzolan, and a small amount of the end liquor resulting from the separation of glutamic acid from concentrated Steffen filtrate, said amount, reckoned on a dry basis, being between about 0.02 and 0.8 percent by weight of the combined cement and pozzolan content of said mixture.

6. A cementitious mixture according to claim 1 wherein said end liquor has a pH of about 3.2 immediately prior to incorporation in the mixture.

7. A cementitious mixture according to claim 1 wherein the said end liquor is the neutralization product resulting from the neutralization of acidic end liquor with a base to bring the pH to a value between about 4.5 and 8.

References Cited in the file of this patent

UNITED STATES PATENTS

| 2,311,288 | Booth | Feb. 16, 1943 |
| 2,311,290 | Booth | Feb. 16, 1943 |
| 2,418,431 | Scripture | Apr. 1, 1947 |
| 2,588,248 | Klein | Mar. 4, 1952 |

FOREIGN PATENTS

| 413,322 | Great Britain | 1934 |